United States Patent [19]
Friedrich

[11] Patent Number: 5,636,610
[45] Date of Patent: Jun. 10, 1997

[54] MULTI-CHAMBER ROTARY PISTON-ENGINE

[76] Inventor: Werner E. Friedrich, Eichenweg 3, D-67141 Neuhofen, Germany

[21] Appl. No.: 244,155

[22] PCT Filed: Nov. 17, 1992

[86] PCT No.: PCT/DE92/00957

§ 371 Date: Sep. 29, 1994

§ 102(e) Date: Sep. 29, 1994

[87] PCT Pub. No.: WO93/10332

PCT Pub. Date: May 27, 1993

[30] Foreign Application Priority Data

Nov. 21, 1991 [DE] Germany ............... 41 38 204.8

[51] Int. Cl.$^6$ ............................................. F02B 53/00
[52] U.S. Cl. ........................ 123/236; 418/137; 418/176
[58] Field of Search .................................. 123/236, 237, 123/239; 418/137, 176

[56] References Cited

U.S. PATENT DOCUMENTS

| | | | |
|---|---|---|---|
| 788,179 | 4/1905 | Wheeler | 418/137 |
| 3,073,118 | 1/1963 | August | 123/236 |
| 3,883,277 | 5/1975 | Keller | 418/137 |
| 4,170,978 | 10/1979 | Eslami | 123/239 |

FOREIGN PATENT DOCUMENTS

| | | | |
|---|---|---|---|
| 914686 | 8/1954 | Germany | 418/176 |
| 2838000 | 3/1980 | Germany . | |
| 464382 | 6/1951 | Italy | 123/237 |
| 57-203802 | 12/1982 | Japan | 123/236 |

*Primary Examiner*—Michael Koczo
*Attorney, Agent, or Firm*—Galgano & Burke

[57] ABSTRACT

A multi-chamber rotary piston internal combustion engine includes an engine housing having interior walls defining a plurality of internal cylindrical cavities, at least one of the cavities being disposed in a first housing level and at least one other of the cavities being disposed in a second housing level spaced apart but adjacent to the first housing level. A plurality of rotary pistons and cylinders are movably mounted relative to the cavities which, in operation, cooperatively define, at least partially with the housing interior walls, a multiplicity of sequentially-arranged chambers including a gas intake chamber, and at least one gas compression chamber located in the first housing level and an ignition chamber, gas expansion chamber and a gas expulsion chamber located in the second housing level, with the cylinders, pistons and cavities being operatively arranged so that gas intake, compression, ignition, expansion and gas expulsion take place simultaneously during one revolution.

7 Claims, 9 Drawing Sheets

MULTI-CHAMBER ROTARY PISTON-ENGINE

BACKGROUND OF THE INVENTION

The present invention relates to the principle of a multi-chamber rotary piston internal combustion engine.

In contrast to the multi-chamber rotary piston internal combustion engine according to the invention, most internal combustion engines today function as piston engines between fixed volume limits, which do not allow the working gas in the cylinder to relax to ambient pressure during the expansion stroke.

The kinetic and heat energy still contained in the exhaust gases is being utilized, in the meantime, by ever more developed techniques to improve the energy balance of such internal combustion engines. For example, exhaust gas turbocharging technology has gained great importance.

Furthermore, improvements are achieved by more precise metering of fuel supply by means of injection pumps, as well as improvement of the air conditions by means of air compression technology. Increasing the number of intake and outlet valves for gas exchange also contributes to increasing the degree of effectiveness of these engines.

However, the structure of today's piston engines will always set limits for optimization of the energy balance. The unutilized release of a high percentage of the energy contained in the fuel to the environment cannot be avoided with this technology.

Until now, the development of rotary piston engines has also not resulted in solutions which yielded convincing advantages as compared with the former concepts and were able to succeed on the market.

The best-known result of this development is the Wankel engine. However, it also does not offer any decisive improvement with regard to energy yield and environmental impact. Its current market importance can practically be ignored.

The idea of a multi-chamber engine in which all the motor functions take place simultaneously, next to one another, is also pursued with different technical solutions by the patent applications and/or patent Nos.: DE 2,828,000 and U.S. Pat. No. 4,170,978, as well as FR 2,105,695; JP 57,203,802 and U.S. Pat. No. 4,658,779. In this connection, reference must also be made to the following patent documents: U.S. Pat. No. 788,179 U.S. Pat. No. 3,073,188 U.S. Pat. No. 3,883, 277 as well as U.S. Pat. No. 1,464,382 and DE 914, 686. However, the motor concepts among these documents exclusively involve piston and cylinder units which run internally, which differ in practically all essential parts from the technical solutions of the multi-chamber rotary piston internal combustion engine presented here. Obviously, it was not possible to achieve market success with their technical suggestions until now, either.

The multi-chamber motor with two specific functional units presented with the present application is new: Cylinder and piston combinations which run on the inside for the functions of intake, and compression, on the one hand, correspond with cylinder and piston units which run on the outside for the functions of combustion, expansion and gas expulsion, on the other hand.

It remains true that current internal combustion engines, with energy yields below 50%, represent an enormous waste of resources, particularly in view of the ever decreasing supplies of these resources. Technical solutions to improve the energy balance of conventional engine technology are obviously limited and only possible with significant effort and expense.

SUMMARY OF THE INVENTION

Accordingly, it is an object of the present invention to provide the principle of a multi-chamber rotary piston internal combustion engine which offers the technical prerequisites for a better energy yield and puts less of a burden on the environment than previous internal combustion engines.

It is a more particular object of the present invention to provide a multi-chamber rotary piston internal combustion engine with several chambers arranged one after the other in two engine housing levels.

This task is accomplished, according to the invention, by the characteristics indicated in Claim 1, namely by a multi-chamber rotary piston internal combustion engine with several chambers (18a and b, 19, 29, 30a and b, 27) arranged one after the other, in which the engine functions of intake, compression, end compression, ignition, combustion, expansion and gas discharge take place simultaneously, next to one another, during a revolution, with the gas flow through the individual chambers being regulated with rotation symmetry in the logic of this engine, via a central gear control shaft (52), by means of gear wheel transmissions (53a, b, 40, 17, 15, 39) and by cylinders and pistons which rotate in/around the chamber(s), in controlled manner.

BRIEF DESCRIPTION OF THE DRAWINGS

In the drawings, wherein similar reference numerals denote similar elements throughout the various views.

DESCRIPTION OF A PRINCIPAL EMBODIMENT AND ITS FUNCTIONS

Referring now in detail to the drawings and, in particular, FIGS. 1–8, therein illustrated is a multi-chamber rotary piston internal combustion engine which has a housing 20 with an intake chamber 18a, a compression chamber 18b and a second compression chamber 19, as well as cylinder and piston arrangements which rotate on the inside and are moved, on a first inner plane or level of the housing. Furthermore, an ignition chamber 29, an expansion chamber 30a and a gas expulsion chamber 30b with cylinder and piston arrangements which rotate on the outside and are arranged on a second outer plane or level axially spaced from the first level.

The intake and compression chambers are formed in a hollow cylinder 18, between the double rotary piston 1, 2 and the first rotary cylinder 3, as well as the lateral surfaces of the housing wall 20. The double or twin rotary piston 1, 2 are rigidly connected with the piston shaft 5 and 6. A gear wheel 17 is seated on the piston shaft 5. The double rotary piston 1, 2 has an acute angle position relative to the second compression chamber 19. In this position, during the bottom dead point of the compression piston 11, the connection between the chambers 18a, 18b and 19 is interrupted. The hollow cylinder 18 has an intake opening 12 for combustion gases and an overflow opening towards the second compression chamber 19.

The second compression chamber 19 is a cylindrical hollow chamber with an overflow connection to the control piston cylinder bushing 38. A piston 11 which can be displaced axially is moved in the second compression chamber 19. The compression piston 11 is controlled by way of the cam disks 13 on the cam shaft 14 and the gear wheel 15. The compression piston 11 has an acute angle position at its bottom dead point, in which there is no connection to the adjacent chambers 18a, 18b as well as to the ignition chamber 29.

The ignition chamber 29 is a cavity between two control pistons 24, 25, which rotate concentrically around a common axis in a axially half open hollow cylinder 38. These control pistons 24, 25 have an entry angle position at which there is a connection between the second compression chamber 19 and the ignition chamber 29. Furthermore, the control pistons 24 and 25 have a combustion angle position in which the connection to the second compression chamber 19 is interrupted and the control pistons are moved apart in such a way that a connection is produced between the ignition chamber 29 and the expansion chamber 30a.

The screw housing 26 including the control piston cylinder bushing 38 as the stator lie eccentrically within the rotary expansion cylinder 22, in such a way that this second cylinder 22 can form the expansion chamber 30a and the gas expulsion chamber 30b with the pivot piston 23 which is coupled with it.

The expansion chamber 30a is limited by the rotary cylinder 22 with the pivot piston 23 coupled with it and reaching through the cylinder 22; furthermore, by the surface profile of the screw housing 26 and the lateral walls of the engine housing 20.

The gas expulsion chamber 30b is formed by the front face of the pivot piston 23, the rotary cylinder 22 as well as by the screw housing 26 and the lateral walls of the engine housing 20.

The pivot piston 23 has guide elements 32, 33, and guide devices 42, 43 are present in the engine housing wall 20, for forced guidance of the oscillating pivot piston 23. At the rear end of the screw housing 26—seen in the direction of rotation—outlet openings 28 lead into an exhaust chamber 27 which passes through the screw housing 26.

An external gear crown 39, which is connected with the central gear control shaft 52 via gear wheels 40, 53b, is seated on the rotary expansion cylinder 22.

The engine has a central gear control shaft 52, by means of which gear control shaft 52, the double rotary pistons 1, 2, the rotary cylinder 3, the compression piston 11, the control pistons 24, 25 as well as the rotary expansion cylinder 22 with the pivot piston 23 coupled with it are controlled with rotation symmetry, by means of gear wheels 53a, 53b, 40, 39, 15 and 17. The gear control shaft 52 is also in gear engagement.

The method of operation of the engine according to the invention will now be explained.

Intake/Precompression

In the cylinder bushing (18) defined by the engine housing wall (20), on two axes offset relative to one another, two rotation pistons (1+2) are moved on the one axle, and the first rotation cylinder (3) which is movably connected with these pistons by means of the cylinder sliding blocks (8+9) is moved on the other axle as an interior rotor. The twin rotation piston I (1) is affixed to a shaft (5), which is held in the center of the cylinder bushing (18) surrounded by the engine housing wall (20) by means of the piston shaft pin (7). On the same axle pin (7) with the axle (6), the twin piston II (2) runs as a follower of the twin piston I (1). (FIG. 2 to 9). In the flat sidewalls of the cylinder bushing (18), guide grooves (16) provide a rotation bed for the flanges (4) of the first rotation cylinder (3). The axle of the first rotation cylinder (3) lies on the diameter of the cylinder bushing (18), its diameter is less than that of the cylinder bushing (18).

At the peak (63) on the corner edge of the cylinder bushing (18) and the cylinder wall of the compression piston (11), the first rotation cylinder (3) seals the compressed mixture (18b) off with regard to the fresh gas being taken into the chamber (18a). Towards the opposite rounded part of the cylinder bushing (18), it forms the sickle-shaped intake and compression chamber (18a, b). (FIG. 2–8). The sliding blocks (8, 9) which are affixed movably on the inner cylinder (3) by means of axle pins (10) allow the cylinder ends to slide up and down on the end surfaces of the pistons during the piston and cylinder revolutions.

During one revolution, the two twin pistons (1+2) move relative to one another in a manner comparable to the opening and closing of a pair of scissors, and thus equalize their different angle positions relative to the inner cylinder (3) during the revolution. At each revolution, the rotating twin piston I (1) and its follower piston II (2) form two chambers (18a+b) which are constantly changing in volume, in such a manner that the compression chamber (18b) is reduced to as little as zero between the front face of the piston I (1) and the walls of the cylinder bushing (18) and of the first rotation cylinder (3), and the intake chamber (18a) is increased from zero to its full volume between the rear end face of the piston II (2) and the walls of the cylinder bushing (18) and of the rotation cylinder (3).

In FIGS. 2–2a and FIGS. 3–3a, as well as FIGS. 4 to 9 show the function and progression of a revolution of these moved parts during intake and compression, in the first housing level.

Figure 4:
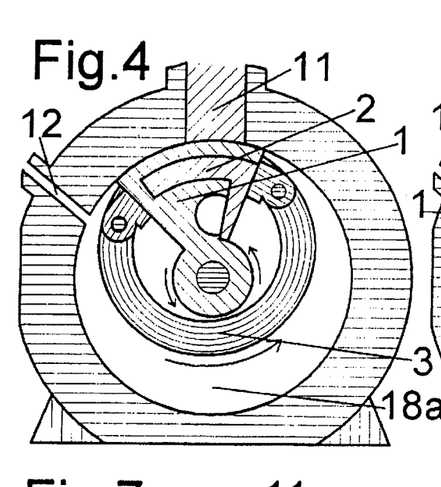
FIGS. 4–9 are transverse schematic illustrations of the intake and compression functional parts of the engine sequentially illustrating the movement of the internal cylinder and pistons during one revolution in the first housing level.
Figure 5:
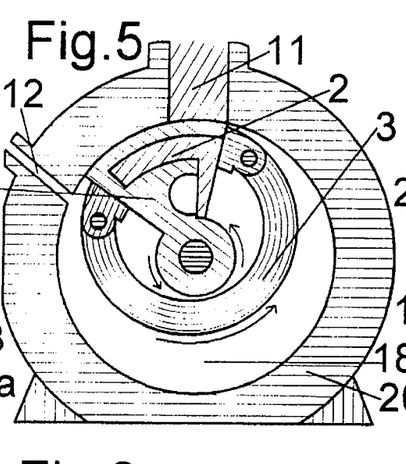

In FIG. 4, the intake chamber (18a) was filled with fresh gas through the gas-mixture inlet opening (12). The rotational movement of the twin piston I (1) in a counterclockwise direction compresses the gas mixture, until it has received the greatest possible compression pursuant to the position in FIG. 9.

With this, the process of gas filling and compression in the intake and compression chambers 18a, b, has been completed, and the same process repeats itself when the twin piston I (1) continues to rotate in a counterclockwise direction.

End Compression

The compression piston (11) is pushed up by the precompressed mixture, due to the movements of the twin piston I (1) pursuant to the positions as in FIGS. 6 to 9. The movements of the piston (11) are determined by the cam disks (13). In the position pursuant to FIGS. 3, 3a as well as FIG. 7, the piston (11) reaches its upper dead center. After precompression has taken place, the cam plates (13) press the compression piston (11) down to its bottom dead center. This happens during the movement of the twin piston I (1) from the position pursuant to FIG. 9 to the positions pursuant to FIGS. 4 and 5. (FIGS. 9, 4, 5, 2, 2a). The compression piston (11) already starts the compression movement in the opposite direction after it has reached the upper dead center pursuant to the position in FIG. 7 even before the twin piston I (1) has reached its upper dead center position pursuant to FIG. 9.

Figure 6:
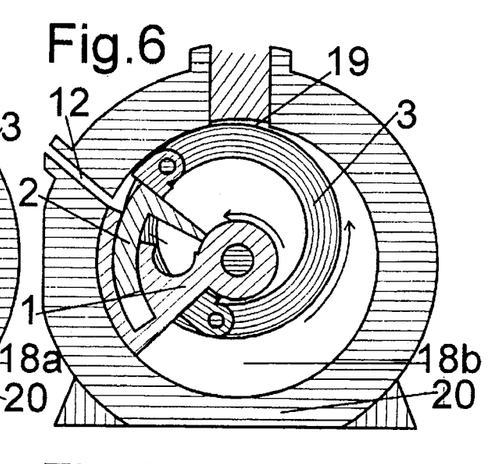
Figure 7:
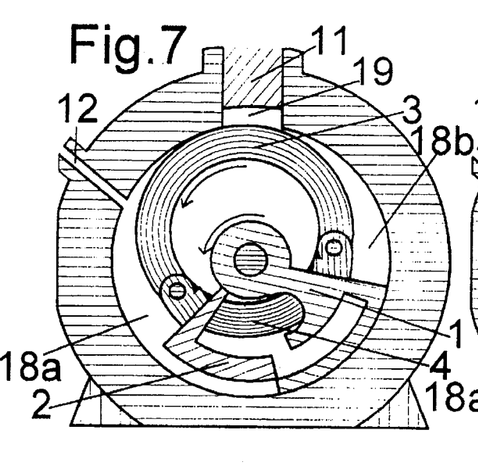
Figures 8, 9:
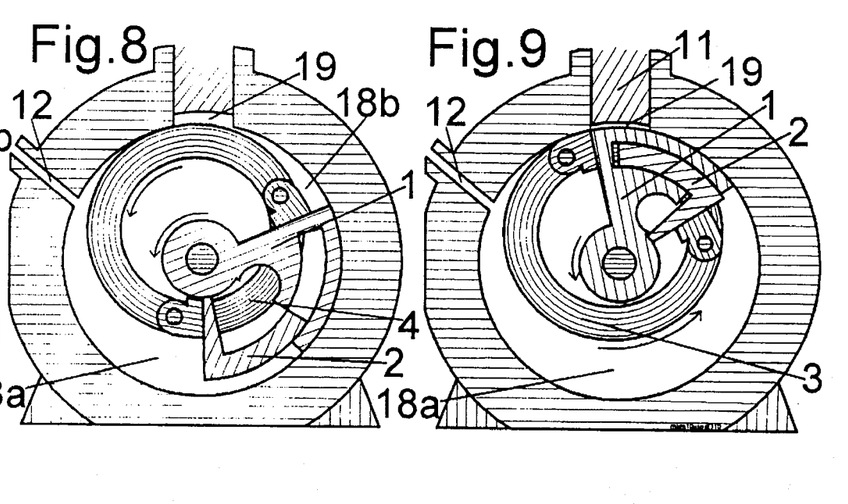
Figures 12, 13, 14, 15:
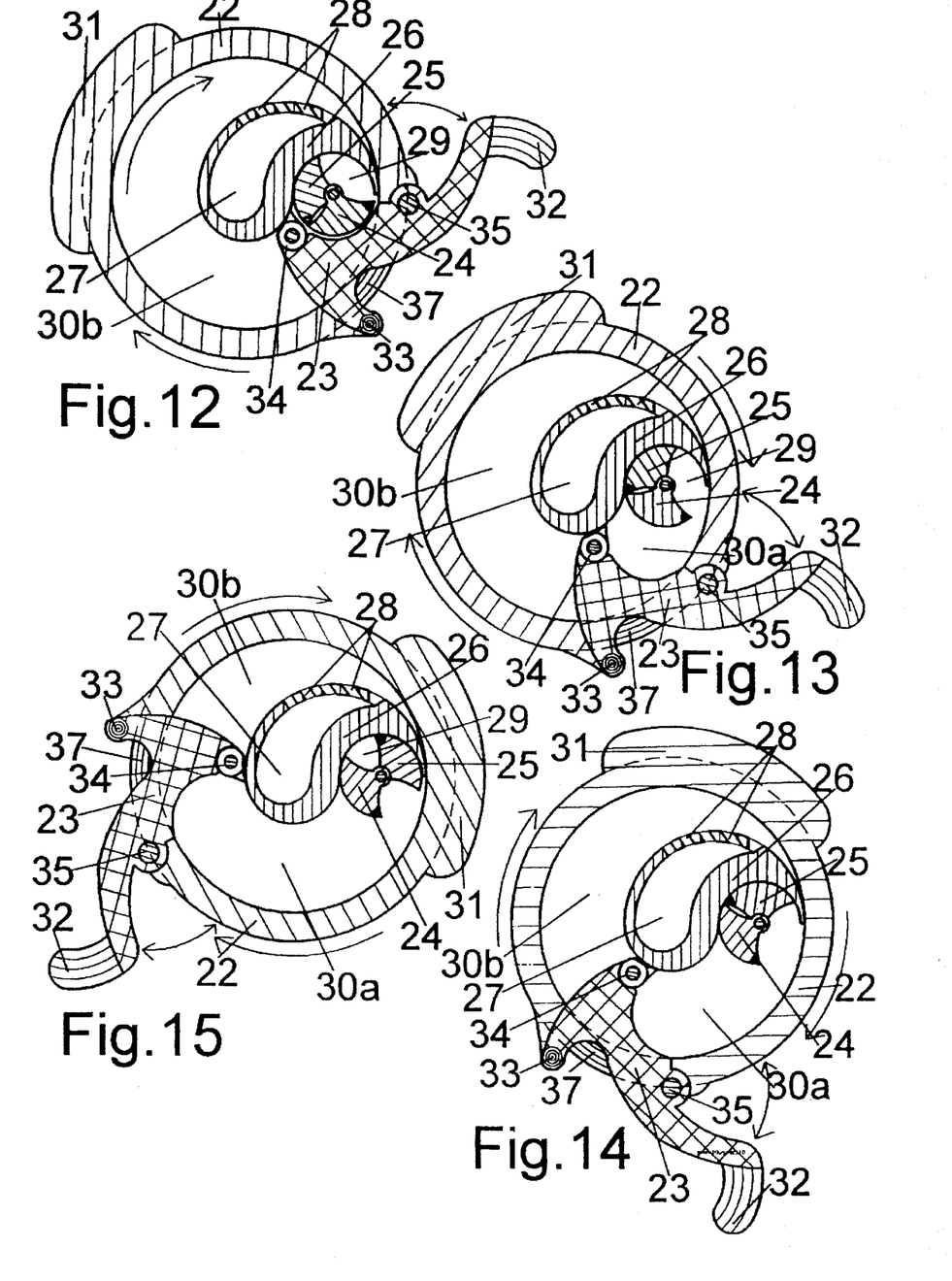
Figures 16, 17, 18, 19:
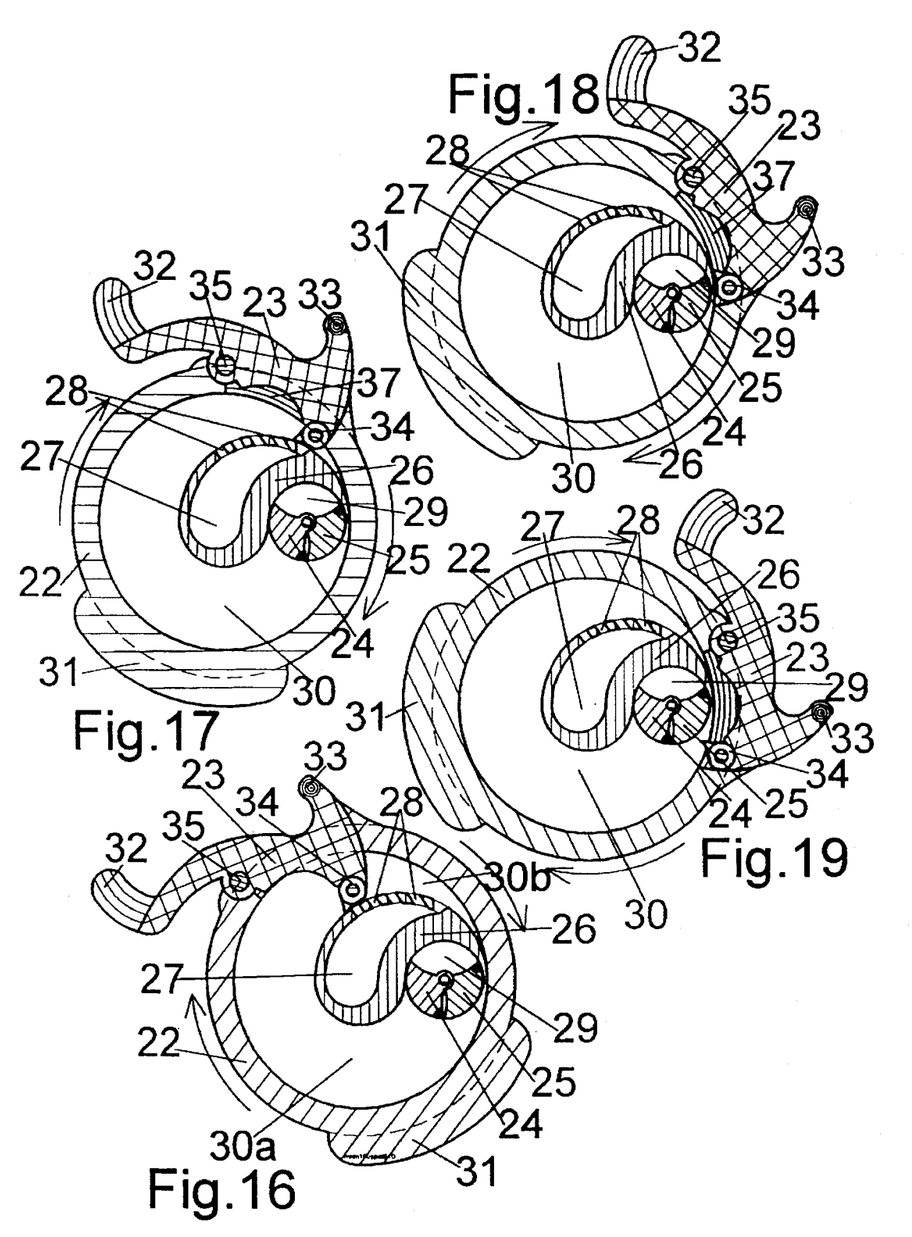
Figure 20:
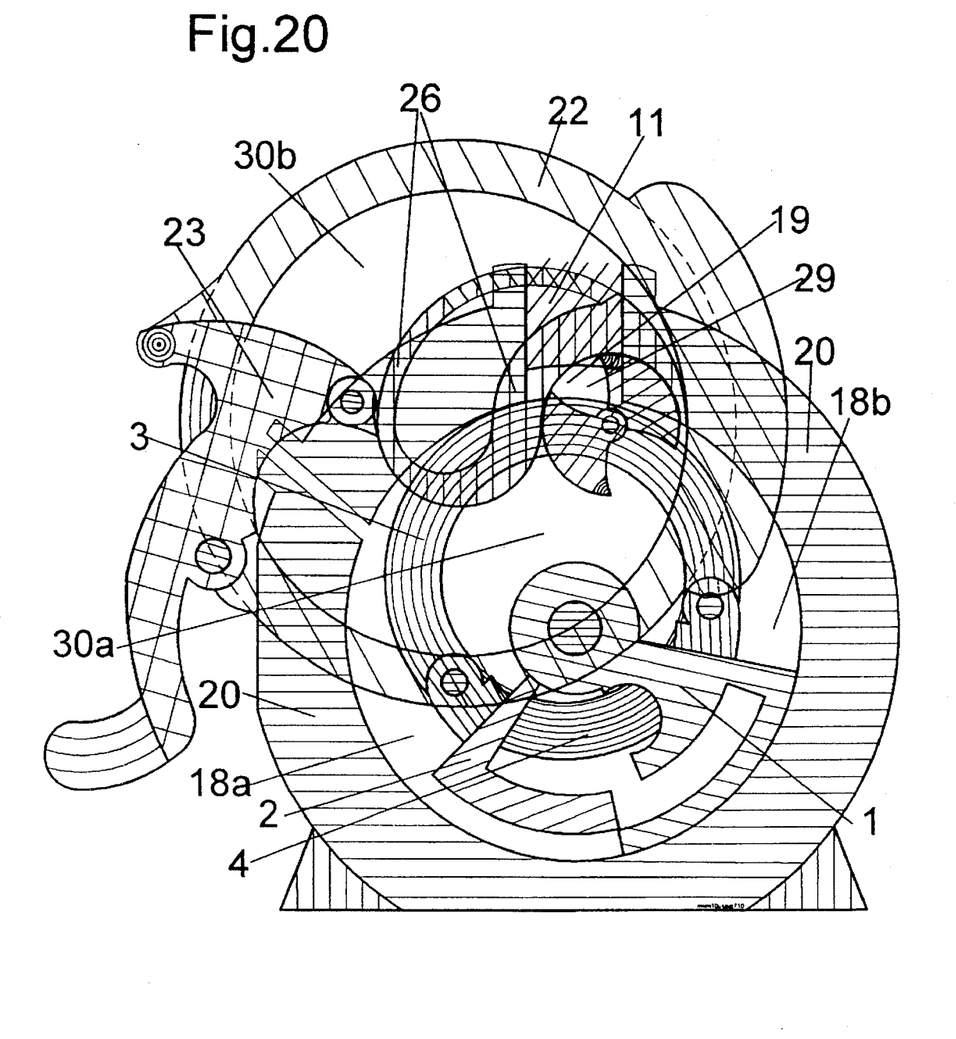
FIG. 20 is a cross-sectional view of the engine illustrating the position of the communicating functional parts in the first and second housing level to show the flow path of the gases through the engine at this transition.
Figure 21:
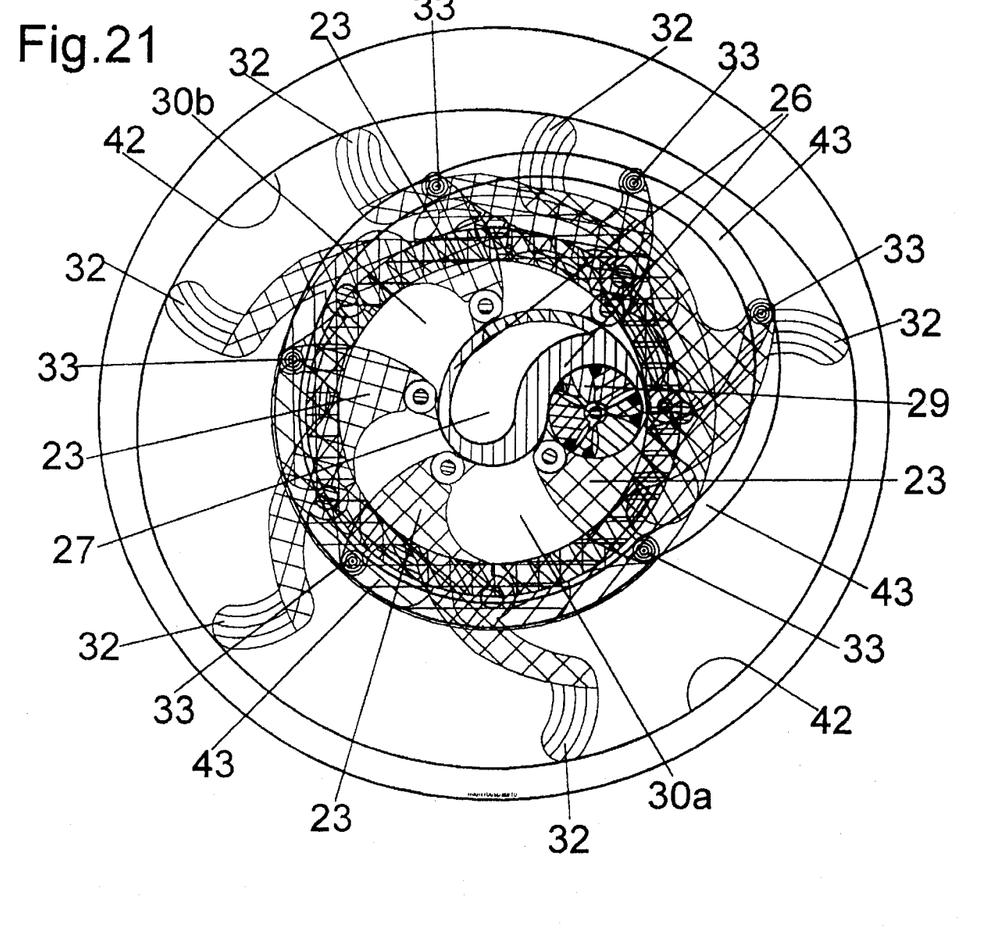
FIG. 21 is a cross-sectional view showing the relative positions of the expansion cylinder relative to the pivot piston and to the guide devices and the screw housing during one revolution.
Figure 22:
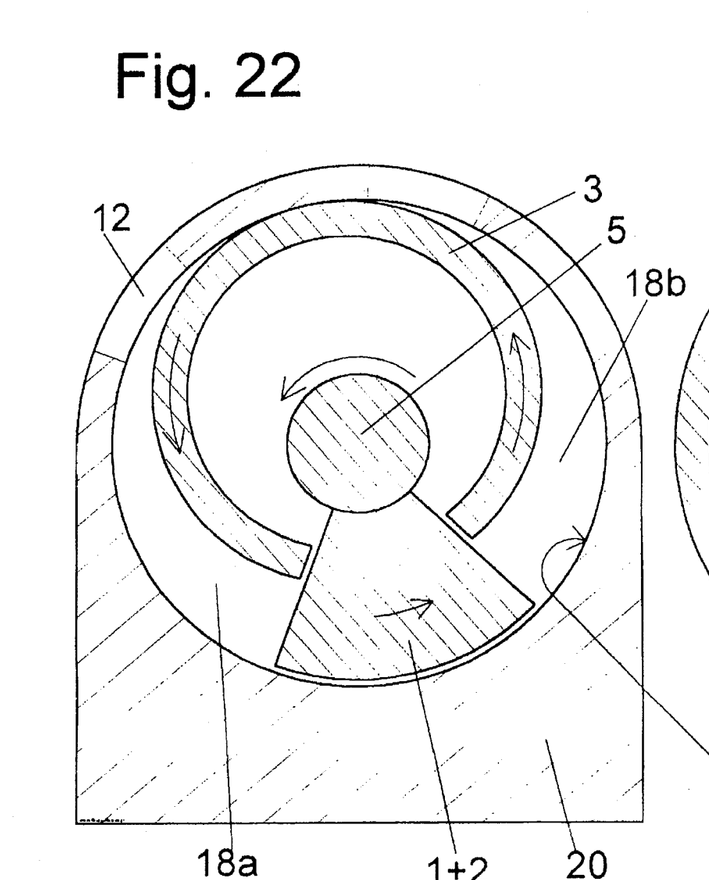
FIGS. 22 and 23 are schematic cross-sectional views showing the internal rotors (FIG. 22) in the first housing level and the external rotors (FIG. 23) in the second housing level.
Figure 23:
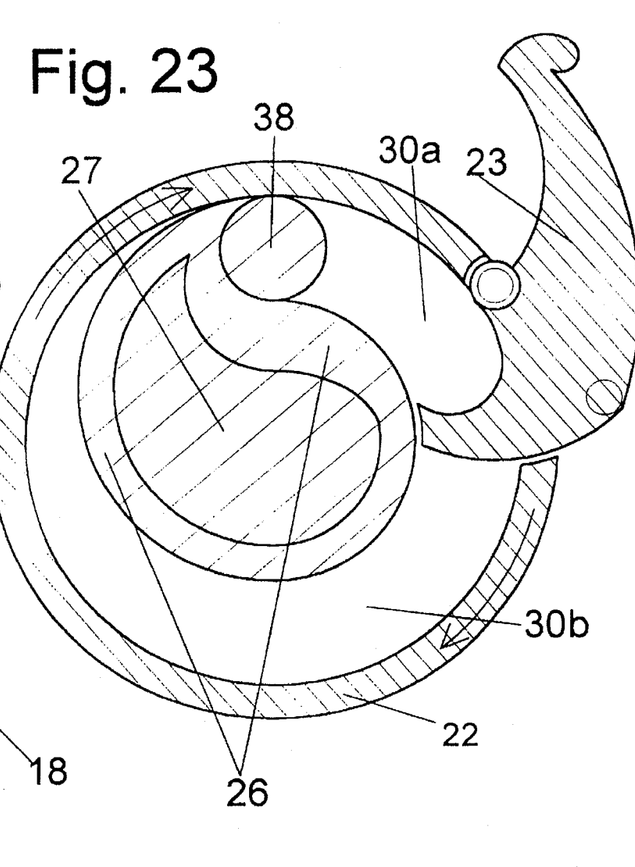

At the same time with the compression in the chambers (18b and 19), the ignition chamber (29) is filled, beginning approximately with the position of the twin piston I (1) pursuant to FIGS. 6 and 7 and the position of the pivot piston (23) on the expansion cylinder (22) pursuant to FIGS. 14, 15, 16. This becomes possible because the piston valve I (24) is held in place in its position pursuant to FIG. 14 by means of a control mechanism and the piston valve II (25), which is freely movable in this phase of the revolution, is moved further by means of the gas pressure which builds up (FIG. 15), to its position pursuant to FIG. 16, in which the maximum possible volume of the ignition chamber (29) between the two piston valves (24, 25) has been reached. The position reached by the piston valves (24, 25) in FIG. 16 is maintained by them until just before ignition of the gas mixture pursuant to FIGS. 11, 12. The ignition compression of the gas mixture in the ignition chamber (29) has been reached when the cam disks (13) have pushed the compression piston (11) down to its bottom dead center.

After this position of the compression piston (11) has been reached, the second compression chamber (19) is entirely closed off towards the ignition chamber (29). (FIGS. 4, 5, 11, 13, 18 and 19.)

Ignition/Expansion/Work Cycle

Figures 10, 11:
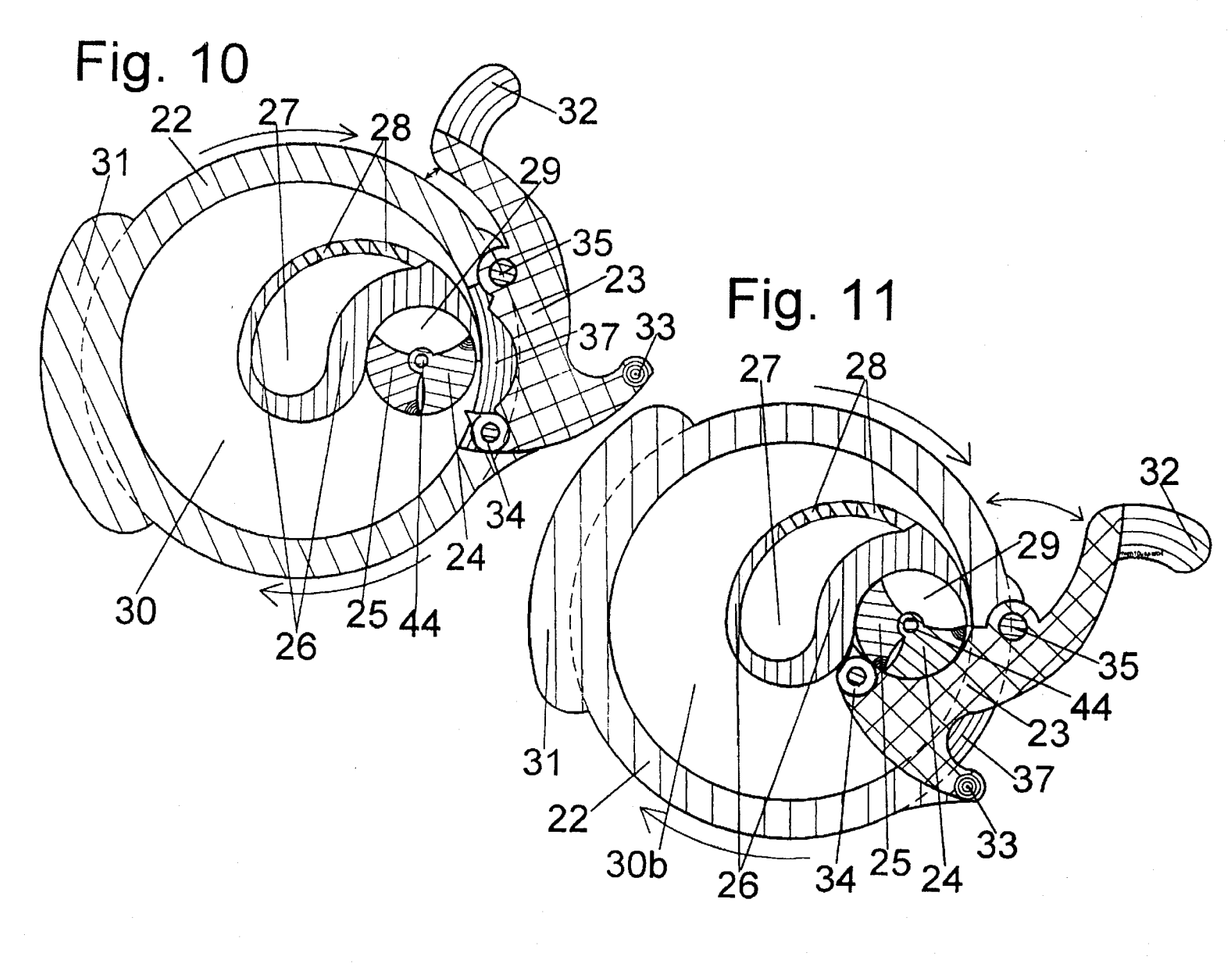
FIGS. 10–19 are schematic cross-sectional views sequentially illustrating the positions of the expansion cylinder/external rotor 22 about the screw housing during the ignition/combustion and expansion phase in the second housing level.

When the compression piston (11) reaches its bottom dead center, the end-compressed mixture in the ignition chamber (29) is ignited and moved further by the piston valve (24) in this phase. (FIGS. 11, 12, 13). Now the working gas can escape from the ignition chamber (29) and do its work. The ignited mixture presses into the expansion chamber (30a) and there presses the pivot piston (23) and with it the expansion rotation cylinder (22) further in a clockwise direction (FIGS. 12 to 15). At the same time, the pivot piston (23) pushes the exhaust gases which are still present in the cylinder space (30b) from the previous expansion cycle through the exhaust gas outlet openings (28) into the exhaust chamber (27) located in the interior of the screw housing (26) with its end face, and from there further through the side wall (20) of the engine housing and the exhaust pipe (54) into the open, (FIGS. 12 to 17). Guided along the guide wall (42) by the sliding block (32) and in the guide groove (43) by the guide connector (33), the pivot piston regains its position around the screw housing (26) and the piston valves (24, 25) pursuant to FIG. 11. The tilting and pivoting movements are supported by the tension springs in the pivot piston axle (35) and the tipping sliding block (34).

It becomes clear that in this design, the entire kinetic energy which is released from the expanding gas mixture by relaxation to ambient pressure can be converted to forward drive, since the dwell time of the gases in the expansion chamber (30a) allows a nearly complete relaxation.

In the case of piston engines whose pistons move back and forth between fixed volume limits at extremely short cycle times, complete relaxation of the gas pressure to ambient pressure is not possible.

Thus a revolution has been completed while the engine functions of intake, compression, ignition, combustion, expansion/work cycle and gas expulsion occur simultaneously next to one another in these chambers (18a, b, 19, 29, 30a, b, 27) arranged one behind the other.

Control Mechanisms

The technique described here, with the cylinders and pistons rotating in the individual chambers, requires control with rotation symmetry. These control mechanisms are accomplished as follows in the engine according to the invention:

The torque of the expansion cylinder (22) is transferred to the gear control shaft (52) by means of the outside gear crown (39) and the gear wheels (40, 53b). As already described above, the twin piston I (1) is driven on the piston shaft (5) by the gear control shaft (52), via the gear wheels (53a, 17). The twin piston I (1) moves the internal rotor (3) embedded in the guide grooves (16) as its follower, and the twin piston II (2) on the axle (6).

Via the same gear wheel transmission, the cam shaft (14) with the cam disks (13) are further moved by the gear wheel (15), and thus the stroke movement of the compression piston (11) is achieved.

In the position of its bottom dead center, the compression piston (11) seals tightly with the twin piston t (1), on the one hand, and towards the piston valve cylinder bushing (38) with the piston valves I and II (24, 25), on the other hand. (FIGS. 2, 2a, 4, 5).

The tight seal of the compression piston (11) towards the ignition chamber (29) now allows the piston valves (24, 25) to continue turning with the compressed gas mixture in the piston valve cylinder space (38), as described above.

With this method of working, a clearly improved degree of effectiveness as compared with conventional internal combustion engines is achieved, by means of the fact that all the engine functions occur during one revolution, a more advantageous power transmission due to the specific cylinder and piston configuration (functional units which run on the inside for compression and functional units which run on the outside for combustion/expansion) as well as the advantageous gear wheel transmissions for the piston and cylinder movements, an almost complete conversion of the kinetic energy of the ignition gases into torque, since the dwell time of the combustion gases in the expansion chamber allows nearly complete relaxation and thereby perform more work.

In this way, the following are advantageously obtained:

a significant reduction of the fuel consumption, minimal engine noises, since there is no afterburning of the exhaust gases, minimization of pollutant emissions (depending on the fuel), and in total, a reduction in the burden on the environment.

Figure 1:
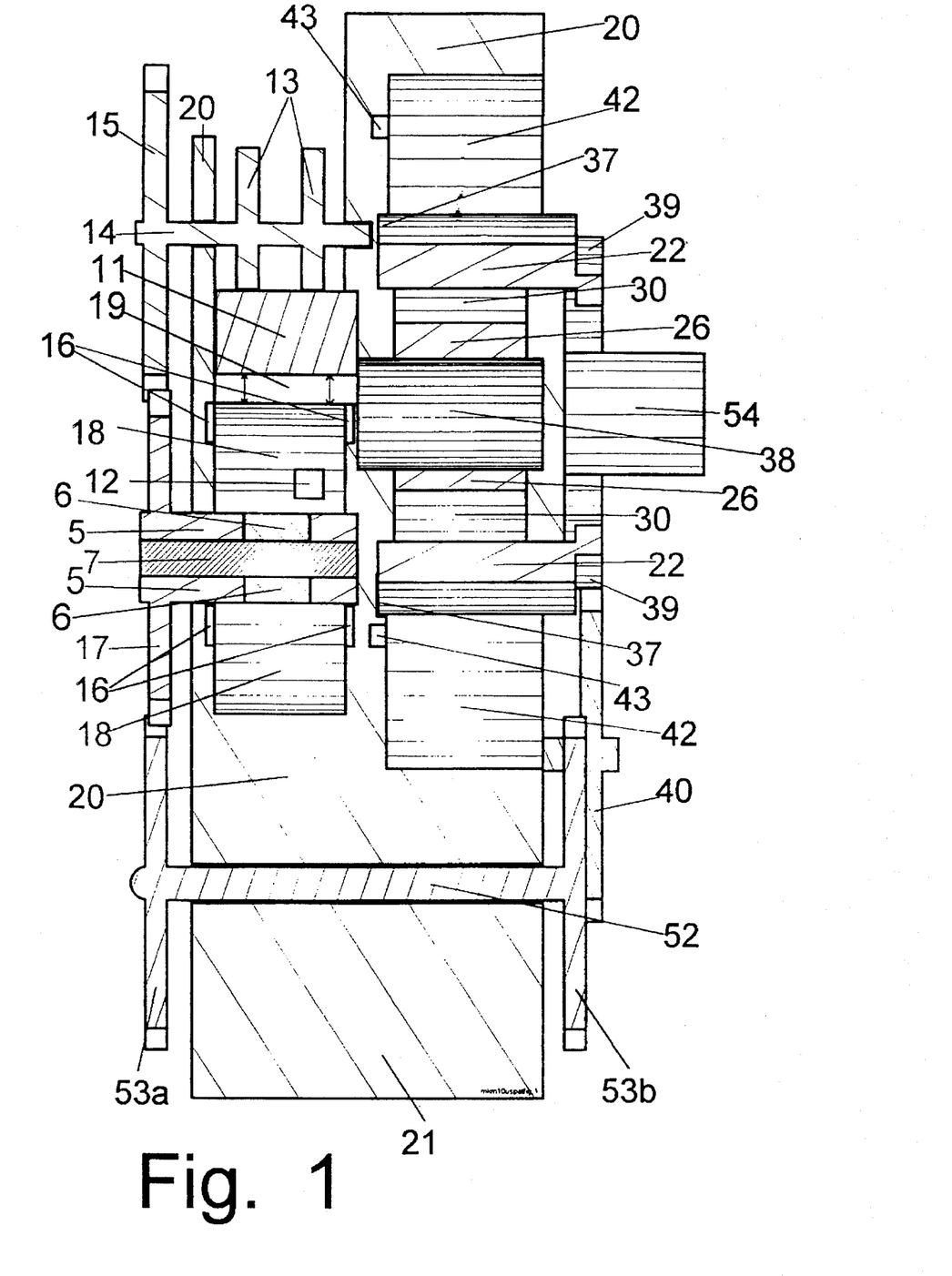
FIG. 1 is a schematic longitudinal sectional view of a multi-chamber rotary piston internal combustion engine embodying the present invention.
Figures 2, 2A:
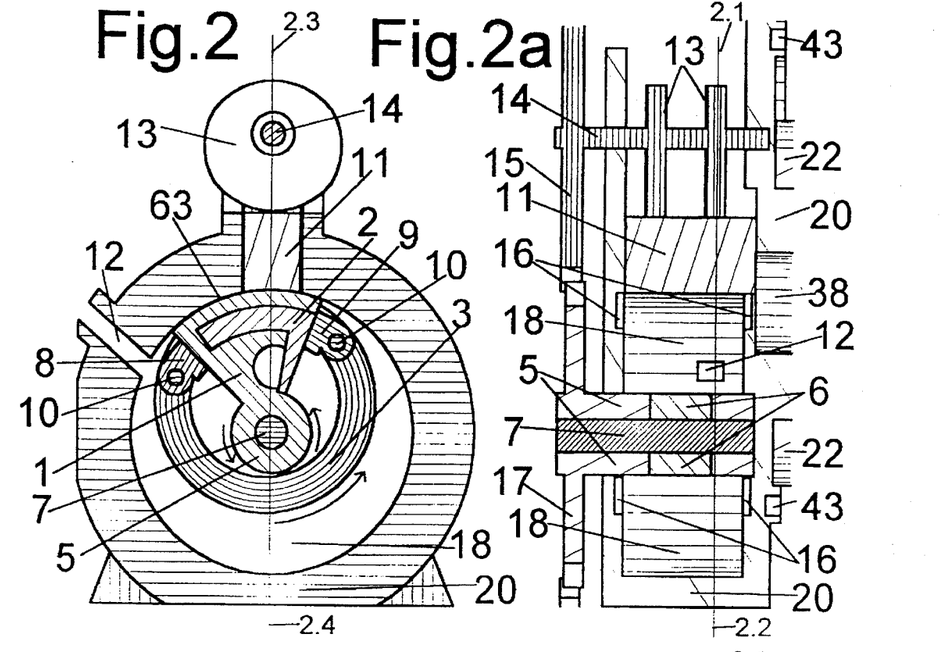
FIG. 2 is a transverse sectional view of the first housing level of the engine shown in FIG. 1 showing the position thereof at the start of the engine cycle.
FIG. 2a is a longitudinal sectional view taken along line 2/3–2/4 of FIG. 2.
Figures 3, 3A:
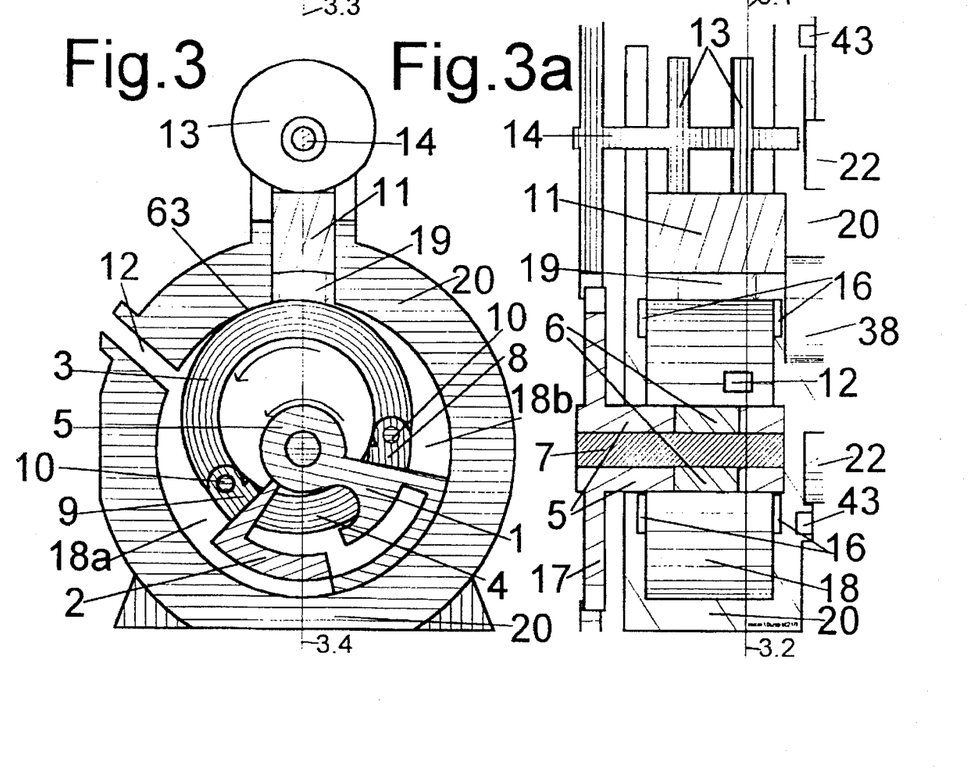
FIG. 3 is a transverse sectional view of the intake and compression functional parts during the compression cycle.
FIG. 3a is a longitudinal sectional view taken along line 3/3–3/4 of FIG. 3.

A principal embodiment of the multi-chamber rotary piston internal combustion engine according to the invention is shown in the drawings. These show: FIG. 1—a schematic representation of the engine according to the invention by means of an overall cross-section. However, the cylinder bushing (18) is shown without the twin pistons (1 and 2) and the first rotation cylinder (3), likewise the cylinder bushing (38) is not shown with the piston valves (24 and 25), and the second rotation cylinder (22) is shown without the pivot piston (23). In this overall representation, the arrangement of the chambers in the first and second housing levels becomes more clearly visible with this. A further description of FIGS. 1–23 has been given above.

Labeling of the Drawings

1. Twin Piston I
2. Twin Piston II
3. First rotation cylinder/Internal rotor.,
4. Cylinder flange
5. Shaft of twin piston I
6. Shaft of twin piston II
7. Piston shaft pin
8. Cylinder sliding block I
9. Cylinder sliding block II
10. Articulated pin of cylinder sliding block 8 and 9
11. Compression piston
12. Gas-mixture inlet opening
13. Plate cam
14. Cam shaft
15. Cam shaft gear wheel
16. Guide groove for cylinder flange 4
17. Gear wheel of piston shaft 5
18. Cylinder bushing
18a. Intake chamber
18b. Compression chamber
19. Second compression chamber
20. Engine housing wall
21. Engine housing base
22. Second rotation cylinder/external rotor
23. Oscillating pivot piston
24. Piston valve I
25. Piston valve II
26. Screw housing
27. Exhaust chamber
28. Exhaust gas outlet openings
29. Ignition chamber
30a. Expansion chamber
30b. Expulsion chamber
31. Equalization weight
32. Guide sliding block
33. Guide sliding connector
34. Tilting sliding block with tension spring
35. Pivot piston axle with tension spring
36. Pivot piston axle pin
37. Cylinder flange of external rotor 22
38. Piston valve cylinder bushing
39. Outside gear crown on second cylinder/external rotor 22
40. Gear wheel
42. Guide wall for sliding block 32
43. Guide groove for sliding connector 33
52. Gear control shaft
53a,b. Gear wheels on gear control shaft 52
54. Exhaust pipe
63. Peak in cylinder bushing 18

What is claimed is:

1. A multi-chamber rotary piston internal combustion engine, comprising:

an engine housing having interior walls defining a plurality of internal cylindrical cavities, at least one of said cavities being disposed in a first housing level and at least one other of said cavities being disposed in a second housing level spaced apart but adjacent to said first housing level;

a plurality of rotary pistons and cylinders movably mounted relative to said cavities which, in operation, cooperatively define, at least partially with said housing interior walls, a multiplicity of sequentially-arranged chambers including a gas intake chamber, and at least one gas compression chamber located in said first housing level and an ignition chamber, gas expansion chamber and a gas expulsion chamber located in said second housing level, with said cylinders, pistons and cavities being operatively arranged so that gas intake, compression, ignition, expansion and gas expulsion take place simultaneously during one revolution, said plurality of pistons and cylinders including a pair of rotary twin pistons and a first cylinder eccentrically disposed relative to said twin pistons serving as internal rotors within said cylindrical cavity of said first housing level and which define therewith said intake chamber and said compression chamber and which, in operation, perform the functions of intake and compression; and said plurality of pistons and cylinders including a second cylinder and an oscillating piston linked to said second cylinder which serve as external rotors rotating about an internal stator in said cylindrical cavity of said second housing and which define therewith said ignition chamber, expansion chamber and gas expulsion chamber and which, in operation perform the functions of ignition, expansion and gas expulsion;

a toothed-gear control shaft;

toothed gear transmission means for effecting mechanical coupling of said control shaft to said pistons and cylinders;

inlet means for combustible gases disposed in said housing and communicating with said intake chamber for introducing said gases thereto; and gas exhaust means disposed in said housing and communicating with said gas expulsion chamber for exhausting gases therefrom.

2. The multi-chamber rotary piston internal combustion engine pursuant to claim 1, characterized in that in a cylinder bushing representing one of said cavities in said first housing level, two chambers of said multiplicity of sequentially-arranged chambers are defined by said internal rotors, namely said rotary twin pistons and said first rotary cylinder forming said gas intake chamber and one said compression chamber in such a manner that said intake chamber located behind the twin piston in the direction of rotation is increased from zero to its full volume during one revolution, and that as a result of the partial vacuum which occurs in said intake chamber fresh gas is drawn through said inlet means communicating with said intake chamber in said first housing level, that said compression chamber located in front of said twin pistons in the direction of rotation is reduced from its full volume to zero during this rotation phase and the gas mixture contained in this chamber is pressed into a second compression chamber of said multiplicity of sequentially-arranged chambers in said first housing level adjacent to said compression chamber.

3. The multi-chamber rotary piston internal combustion engine pursuant to claim 2, characterized in that guide grooves in both flat sides of said interior walls of said cylinder bushing in said first housing level provide a rotation bed for the flanges of said first rotation cylinder, the diameter of which is less than that of said cylinder bushing, in such a manner that said first rotation cylinder forms a gas-tight seal with the rounded part of said cylinder bushing at the peak on the one side and forms a sickle-shaped chamber with said cylinder bushing towards the other side, that the ends of the cylinder mantle of said first rotation cylinder, which is open at one end, are movably connected with the end faces of said twin pistons by means of cylinder sliding blocks, that said sliding blocks allow the ends of said first rotation cylinder to slide up and down on the end faces of said twin pistons during their revolutions, that said twin pistons can equalize their different angle positions relative to said first cylinder during a revolution by means of scissor-like movements relative to one another, that the twin piston one is affixed on a shaft which is fixed in place in the center of said cylinder bushing by means of a piston shaft pin, that said twin piston two rotates on the same axle, that said twin piston one can move said first cylinder and said twin piston two as its followers via said shaft by means of said gear transmissions, that said twin pistons form a gas-tight seal with said cylinder bushing in every position during a revolution.

4. The multi-chamber rotary piston internal combustion engine pursuant to claim 2, characterized in that: a compression piston, movably mounted axially in said second compression chamber of said multiplicity of sequentially-arranged chambers in said first housing level end, compresses the gas mixture into said ignition chamber of said second housing level adjacent to said first housing level, and that said compression piston in its bottom dead center position forms a completely gas-tight seal of said second compression chamber of said first housing level towards said ignition chamber of said second housing level, and as well towards said twin pistons and thus also towards said intake and compression chambers of said first housing level.

5. The multi-chamber rotary piston internal combustion engine pursuant to claim 1, characterized in that: said ignition chamber in said second housing level is formed between two rotation piston valves rotating in a subsequent half-open cylinder bushing representing one further of said cavities in said second housing level, between which piston valves into said ignition chamber the gas mixture is end-compressed, that said piston valves can be controlled by means of a control mechanism, with rotation symmetry, in such a way that when said piston valves continue to turn said ignition chamber opens up into said expansion chamber of said multiplicity of sequentially-arranged chambers located in said second housing level, and thus allows the exploding gas mixture to exert working pressure on said oscillating piston reaching through and linked to said second rotation cylinder serving as external rotors about said internal stator of said second housing level.

6. The multi-chamber rotary piston internal combustion engine pursuant to claim 5, characterized in that: said internal stator in said second housing level is formed by a screw housing comprising said ignition chamber between the engine housing wall with said piston valves as well as an exhaust chamber located on the inside and representing said gas exhaust means disposed in said second housing level and communicating with said gas expulsion chamber for exhausting gases therefrom, that said oscillating piston has a tilting slide block and glides over the semicircular surface profiles of said screw housing with said tilting sliding block forming a gas-tight seal, driven forward by the expanding combustion gases, that this gas-tight gliding is supported by a guide sliding block and said tilting sliding block with said guide sliding block being guided on a guide wall and a guide sliding connector being guided in a guide groove, that the oscillating and tilting movements of said oscillating pivot piston and of said tilting sliding block are supported by tension springs in an oscillating pivot piston axle and in said tilting sliding block.

7. The multi-chamber rotary piston internal combustion engine pursuant to claim 1, characterized in that: an outside gear crown on said second expansion rotation cylinder transfers the torque generated during the work cycle to said toothed gear control shaft via said toothed gear transmission means and thus effecting mechanical coupling of said external rotor with said other pistons and cylinders of said first and second housing levels.

* * * * *